April 3, 1951    L. D. SMULLIN    2,547,054
COAXIAL LINE COUPLING
Filed Sept. 17, 1947

INVENTOR.
LOUIS D. SMULLIN
BY Robert Harding Jr.
ATTORNEY

Patented Apr. 3, 1951

2,547,054

UNITED STATES PATENT OFFICE 2,547,054

COAXIAL LINE COUPLING

Louis D. Smullin, Nutley, N. J., assignor to International Standard Electric Corporation, New York, N. Y., a corporation of Delaware Application September 17, 1947, Serial No. 774,506

6 Claims. (Cl. 178—44)

This invention relates to coupling circuits and particularly to an arrangement of non-radiating transmission lines having certain properties arising out of the symmetry of a common junction.

In the microwave frequency region, use has been made of an arrangement, commonly referred to as the "magic tee," for frequency discriminating purposes, frequency control, etc. The operation of the "magic tee" requires the use of wave guides. However, in many instances, the use of wave guides is inconvenient because of their physical size and weight. This is particularly true in systems operating at frequencies lower than about 5000 megacycles. On the other hand, a coaxial line provides the advantages of being small in size and light in weight, and hence a "magic tee" arrangement of a coaxial line would make certain types of operation possible in systems having rigid weight and space requirements.

An object of this invention is to provide a novel transmission line circuit arrangement providing desirable electrical coupling properties.

The above mentioned and other features and objects of this invention will become more apparent, and the invention itself, though not necessarily defined by said features and objects, will be best understood by reference to the following description of an embodiment of the invention taken in connection with the accompanying drawings wherein.

Figure 1:
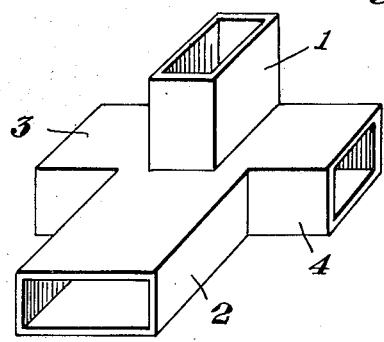
Fig. 1 illustrates a known wave guide junction arrangement of the type known as a "magic tee," used in explaining the function of the system.

Fig. 1 illustrates a wave guide "magic tee" junction. A series and shunt branch wave guide arm, 1 and 2 respectively, are connected to the end wave guide arms 3 and 4, as shown, at a common junction. If an electromagnetic wave is transmitted into the arm 1, coupling between this and the end arms 3 and 4 depends on the fringing of the electric field at the junction. Thus equal waves will travel out each of the two arms but being exactly of opposite phase at points equidistant from the plane of symmetry. In addition of course, there will be a wave reflected from the junction travelling back out the input arm 1.

On the other hand if an electromagnetic wave is applied to the arm 2, it is seen that the two end arms 3 and 4 are excited in the same phase at points equidistant from the plane of symmetry. Again of course there will be reflection from the junction resulting in a wave sent back out the arm 2. Thus it is seen that a wave incident on the arm 2 or on the arm 1 will divide evenly between the left and right end arms so that no power will be coupled directly from the arm 2 to the arm 1, and vice versa. This property has many useful applications such as in radio frequency discriminators, balanced mixers, etc.

Figure 2:
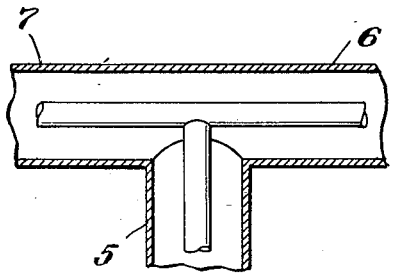
Fig. 2 illustrates a simple coaxial line shunt junction used in explaining the operation of the invention.

Fig. 2 shows a simple known coaxial line shunt junction. As shown, the lines of electric force move out from the junction in time phase, if energy is incident from arm 5, and divide evenly between the end arms 6 and 7. What has not been available heretofore is a convenient series junction between two coaxial lines.

Figure 3:
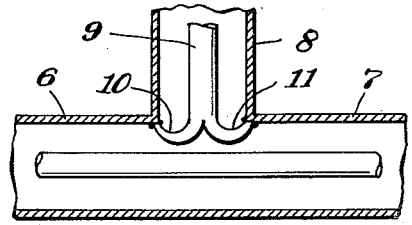
Fig. 3 illustrates a coupling junction arrangement showing one feature of the invention.

Fig. 3 illustrates a series junction, in accordance with the invention. The branch line 8 comprises a center conductor 9 which couples energy into the end arms 6 and 7 (same as the end arms of Fig. 2) by means of probe portions 10 and 11. The probe portions may comprise loop extensions of the center conductor 9 to connect directly with the junctions of the outer conductors of branch lines 8 and 6 and branch lines 8 and 7. These loops are preferably provided accurately parallel to the common center line of branch arms 6 and 7. If power flows into arm 8 towards the junction, it is seen that the currents in loops 10 and 11 will always be in time phase. Since the loops are pointed in opposite directions, however, the magnetic fields associated with the two loops will be in space opposition. These two opposite magnetic fields will excite two waves travelling into branch arms 6 and 7 in which the electric fields are out of phase. This, of course, is characteristic of a series junction.

Figure 4:
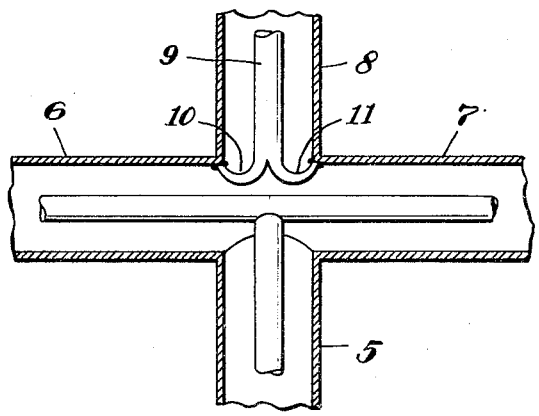
Fig. 4 shows a circuit constructed from the elements of Figs. 2 and 3 in accordance with another feature of the invention.

Fig. 4 shows a coaxial line junction, similar in property to the "magic tee" wave guide junction, constructed from the elements of Figs. 2 and 3. By symmetry, it can be shown that if energy is applied to branch arm 5, the currents in loops 10 and 11 of branch arm 8 will both be in the same direction, and thus no current will flow in the center conductor 9. Hence the waves incident on the series arm 8 or the shunt arm 5 will divide evenly between the left and right arms 6 and 7, but no energy will be coupled directly from the series into the shunt arm, and vice versa.

In order to effect only desirable coupling as described above, it becomes necessary to provide proper impedance matching of the circuit arrangement. In a preferred embodiment $Z_6 = Z_7 \simeq \frac{1}{2} Z_5$, ignoring junctions effects, wherein the subscripts correspond to the impedance of the respective branch arms 5, 6 and 7. The matching of arm 8 is more difficult and would require experimentation with each particular model. However making $Z_6 > Z_8$ is in the right direction since the magnetic coupling due to the loops will be small, and since it will be comparatively simple to excite a high impedance line.

While I have described above the principles of my invention in connection with specific apparatus and particular modifications thereof, it is to be clearly understood that this description is made only by way of example and not as a limitation of the scope of my invention.

I claim:

1. A coaxial line junction between a first coaxial line and an intermediate point on a second coaxial line each having outer and inner conductors comprising, a direct conductive connection between the outer conductors of said first and said second line, two opposed field couplings mounted between the inner conductor of said first coaxial line and said outer conductors a coaxial line junction between a fourth coaxial line and an intermediate point on said first coaxial line, said fourth coaxial line having outer and inner conductors, a direct conductive connection between the inner conductor of said fourth line and the inner conductors of said first line, and a direct conductive connection between the outer conductors of said fourth and said first lines.

2. A coaxial line junction between a pair of coaxial lines for coupling energy from an input coaxial line to an intermediate point on an output coaxial line whereby energy travels in both directions in said output line from the junction point of said lines, comprising a first line having inner and outer conductors and provided with an aperture in said outer conductor at an intermediate point therealong, a second line having inner and outer conductors, the outer conductor of said second line being directly connected to the outer conductor of said first line about said aperture, two oppositely directed probes both arranged in said first line and coupled from the inner conductor of said second line to the junction of said outer conductors, and a parallel coupling between a fourth coaxial line and a second intermediate junction provided with an aperture on said first coaxial line substantially opposite said first named junction comprising a conductive connection between the outer conductors of said fourth line and the outer conductors of said first line at the edges of said last named aperture and a conductive direct connection between the inner conductor of said fourth line and the inner conductors of said first line within the cavity of said first line.

3. A non-radiating coupling arrangement comprising a first non-radiating transmission line section, two other non-radiating transmission line sections, means for coupling said two other lines in parallel with said first line at a common junction whereby radiant energy may be transmitted from said first line to each of said two other lines, a fourth non-radiating transmission line section, means for coupling said two other lines in series to said fourth line substantially at said common junction whereby radiant energy may be transmitted from said fourth arm to each of said two other lines, said first coupling means comprising a conductive coupling, and said second coupling means comprising field coupling between said fourth line and said two other lines respectively whereby electrical energy may be coupled from said first and fourth arms to each of said two other arms without substantially any electrical energy being coupled from said first line to said fourth line, and vice versa.

4. A non-radiating coupling arrangement comprising a first non-radiating transmission line section, two other non-radiating transmission line sections, means for coupling said two other lines in parallel to said first line at a common junction whereby radiant energy may be transmitted from said first line to each of said two other lines, a fourth non-radiating transmission line section, means for coupling said other two lines in series to said fourth line substantially at said common junction whereby radiant energy may be transmitted from said fourth arm into each of said two other arms, said first coupling means comprising a direct conductive coupling and said second coupling means comprising magnetic field coupling between said first and fourth lines and said other two lines respectively, whereby electrical energy may be coupled from said first and fourth arms to each of said two other arms, without substantially any electrical energy being coupled from said first line to said fourth line, and vice versa.

5. A non-radiating coupling arrangement comprising a first coaxial transmission line section, two other coaxial transmission line sections, means for coupling said two other sections in parallel to said first section, comprising each of said sections having their inner conductors coupled conductively at a common junction and having their outer conductors also conductively coupled, whereby energy from said first section may be transmitted to each of said two other sections, a fourth coaxial transmission line section, means for coupling each of said two other sections in series to said fourth section at substantially said common junction comprising said fourth section having its inner conductor extended at substantially said common junction into two probe like portions for field coupling with each of said two other sections whereby electrical energy may be transmitted from said fourth section to each of said two other sections, and whereby electrical energy may be transmitted from said first and fourth sections to each of said two other sections, without substantially any electrical energy being transmitted from said first section to said fourth section, and vice versa.

6. A non-radiant coupling arrangement comprising a first coaxial transmission line section, two other coaxial transmission line sections, means for coupling said two other sections in parallel to said first section comprising each of said sections having their inner conductors directly coupled conductively at a common junction and having their outer conductors also directly conductively coupled, whereby energy from said first section may be transmitted to each of said two other sections, a fourth coaxial transmission line section, means for coupling each of said two other sections in series to said fourth section at substantially said common junction comprising said fourth section having its inner conductor extended at substantially said common junction into two probe like portions for magnetic field coupling with each of said two other sections respectively, whereby energy may be transmitted from said fourth section to each of said two other sections, and whereby electrical energy may be transmitted from said first and fourth sections to each of said two other sections, without substantially any electrical energy being transmitted from said first section to said fourth section, and vice versa.

LOUIS D. SMULLIN.

REFERENCES CITED

The following references are of record in the file of this patent:

UNITED STATES PATENTS

| Number | Name | Date |
|---|---|---|
| 2,412,393 | Ghosh | Dec. 10, 1946 |
| 2,423,390 | Korman | July 1, 1947 |
| 2,426,992 | Folland | Sept. 9, 1947 |
| 2,439,255 | Longfellow | Apr. 6, 1948 |